United States Patent [19]
Gruenberg

[11] Patent Number: 5,029,210
[45] Date of Patent: Jul. 2, 1991

[54] COOPERATIVE COMMUNICATION SYSTEM

[75] Inventor: Elliot L. Gruenberg, West New York, N.J.

[73] Assignee: Compfax Corp., West New York, N.J.

[21] Appl. No.: 471,506

[22] Filed: Jan. 29, 1990

[51] Int. Cl.⁵ .............................................. H04L 9/02
[52] U.S. Cl. ........................................ 380/46; 380/21; 455/25
[58] Field of Search .................... 380/12, 17, 21, 28, 380/46, 48; 455/25

[56] References Cited

U.S. PATENT DOCUMENTS

| | | | |
|---|---|---|---|
| 3,757,335 | 9/1973 | Gruenberg | 455/25 |
| 4,451,699 | 5/1984 | Gruenberg | 455/25 |
| 4,599,648 | 7/1986 | Fujii et al. | 380/21 X |
| 4,805,216 | 2/1989 | Gruenberg | 380/21 |

Primary Examiner—Thomas H. Tarcza
Assistant Examiner—Tod Swann
Attorney, Agent, or Firm—Lieberman Rudolph & Nowak

[57] ABSTRACT

A cooperating communications system in which at least two stations and a connecting communications link form a cooperative communicating loop. Each station contains a plurality of amplification stages, which stages are selected by binary input messages. An oscillating loop is established in response to the selection of a predetermined number of amplification stages. The oscillating loop permits the occurrence of secure communication between the two stations.

6 Claims, 3 Drawing Sheets

COOPERATIVE COMMUNICATION SYSTEM

FIELD OF THE INVENTION

The present invention relates to apparatus and method for cooperative communications over public and private facilities, so that messages may be sent in encrypted form without use of a predetermined encoding signal or key. The system also provides full duplex communications over a single communications channel.

DESCRIPTION OF THE PRIOR ART

In U.S. Pat. No. 4,805,216, dated Feb. 14, 1989, issued to the present inventor, a method and apparatus for "Continuously Acknowledged Link Encrypting" is described, which provides for exchange of messages using the messages themselves as enciphering keys. The present invention provides the same function, but with an improved transmission system.

In the prior system, a composite bit of each message was generated by transmitting to the terminal B, for example, a first bit from terminal A to create at terminal B the Exclusive-0R (XOR) sum, R, of the first bit of A, and the first bit of the message input to B. This bit R was transmitted back to terminal A, where the B bit was removed by XOR summing R with the original A bit stored at A. Thus, terminal A received a message from B. The B bit was then XOR summed with the next bit of A's message to form a new R bit, which was then transmitted to B and the cycle repeated.

A potential problem with the technique described in U.S. Pat. No. 4,805,216, is that an interceptor may monitor the data streams leaving from, and returning to, terminal A, and use this information to adduce the message A from the sequence $A_M \oplus B_M \oplus A_{M-1} \oplus B_{M-1} = A_M \oplus A_{M-1}$, even though B might be a random number. The present invention avoids this problem by insuring that the bits R transmitted from A to B are generated at the same time though they may both be delayed. The instant transmission system does not return bit signals at all, as will be described later, but only sends the representations of the R bit in one direction only. Since the R bit is the composite of the two messages, the cooperative communication system of the instant invention provides full duplex transmission on a single channel.

It is, therefore, an object of the instant invention to provide a cryptographic system for confidential exchange of information over public and private communication systems, which does not require the use of prearranged keys.

It is a further object of the instant invention to provide bidirectional communications over a single channel or wire.

It is a still further object of the instant invention to provide a radio communication system of high immunity to natural and man made interference.

It is another object of the instant invention to provide a two-way private communication system for use on mobile platforms such as automobiles, airplanes, space objects, and even ambulatory individuals, and which requires one channel and, therefore, less bandwidth for communication.

It is a further object of the instant invention to provide cryptosecure modems and telephones which are easy to use and relatively inexpensive.

SUMMARY OF THE INVENTION

The present inventive system apparatus consists of two stations and a connecting communications link which forms a cooperative communicating loop. Each station contains a plurality of stages of amplification. The number of stages at each station is selected by the binary input messages to the stations. For example, if the bit message at a given station is "1", one amplification stage is chosen. If the message is "0", two stages are chosen. Each stage of amplification is inverting; that is the output of the amplifier is 180° out of phase with the input signal. The amplifiers are connected through the communication system to form a potential oscillating loop. As is well known in the state of the art, such a system will oscillate at a given frequency if the gain around the loop is greater than unity, and there is a phase shift of 180° or multiples thereof around the loop. Otherwise, there will be no oscillation. Of particular interest, is the fact that an even number of inverting amplifiers will not oscillate if care is taken to tailor phase shifts in relation to gain by well-known methods originated by Bode.

In accordance with the instant invention, if the number of stages chosen by both terminals is odd, the loop will oscillate, if the number is even it will not. Thus, one can construct the following truth table:

TABLE I

| A | B | NO. INV. AMPS | R | OSCILLATION |
|---|---|---|---|---|
| 1 | 0 | 3 - ODD | 1 | YES |
| 0 | 1 | 3 - ODD | 1 | YES |
| 1 | 1 | 2 - EVEN | 0 | NO |
| 0 | 0 | 4 - EVEN | 0 | NO |

The table shows that the system behaves like the logical operation XOR, and that R, represented by the oscillation is $A \oplus B$.

More particularly, the cooperative action between the system terminals causes the existence of an oscillatory signal, or lack of one, to be present at each terminal depending on the number of inverting amplification stages supplied by each terminal. In this way, the transmitted oscillatory signal is representative of the XOR sum of the digital signals present at the inputs to the terminals. Each terminal uses the transmitted signal to decipher the message of the other, avoiding the need for the use of a key. The inventive method advantageously provides messages to both parties over a single channel, thus saving communication facilities and bandwidth.

It is important to note that if A or B is a random number; that is, a series of random bits, the probability of each bit being 0.5, then R will also be such a random number even though A or B is a message sequence with information content. Shannon has shown that messages so protected are perfectly secret and undecipherable, provided that the random sequence is as long as the message sequence. In accordance with the instant invention, there is no difficulty in providing such a random sequence from a jittered bit generator using certain precautions to reduce bit to bit correlations. There is no need to generate and store specific keys.

The present invention does not require tight bit synchronization between terminals, as is required in prior systems, because the method of generating the transmitted bit insures that it is always a composite of the bit stages of the terminal. This reduces sensitivity to jitter.

The inventive method described herein is not prone to proliferation of errors caused by communication errors, because it does not depend on discrete keys, but each terminal always has a correct copy of the deciphering key, namely its own message. Thus, radio systems using this method will have a high immunity to interference from both man made and natural sources.

As described above, in the cooperative communication system of the instant invention, messages are interchanged between two stations by the existence or nonexistence of an oscillatory signal. This oscillation is determined by the configuration of inverting amplifiers at each station, which configuration is controlled by the binary input signals present at the input to these stations. Thus, an oscillation will exist only if one or the other terminal has a "1" input, and will not exist if both inputs are "1" or "0". In this way, the transmission between the terminals always represents the XOR sum (or product) of the input bits. By detecting this bit, each terminal can decipher the message of the other. This method of modulating the transmitted signal constitutes a new form of modulation, which may be called gain inversion modulation.

It is a feature of the invention that when the input to one of the terminals is a continuous random bit sequence, the transmitted signal is also a random sequence, and completely conceals the digital message input to the other terminal, which message is deciphered by the first terminal by XOR summing with the random sequence which is its input.

It is another feature of the invention that characteristically signals will appear in the transmission path in one direction only; that is in the direction of amplification, but not in the other direction. One line or path, therefore, carries full information from both parties because each terminal can decipher the composite signal on that path.

It is, therefore, another feature of the instant invention that there is provided full duplex information on a single communications channel.

It is a further feature of this invention that in combination with a random sequence generator, there is provided a secure communication system.

It is another feature of this invention that the oscillating transmission signal is the equivalent of the XOR sum of the input signals of the stations.

It is a still further feature of this invention that the message of the receiving station is readable at the transmitting station, and the receiving station depending primarily upon the loop gain and phase inversion status of the cooperative communication loop, and secondarily upon the power of the transmitting station.

It is another feature of the invention that no synchronization signal (clock) is required to be interchanged between the stations.

It is a further feature of this invention that the transmission path may be any type of wired, cable or wireless switched or unswitched system or network.

It is a still further feature of the invention that it can be used with other methods of scrambling and descrambling to enhance the security of the message.

It is another feature of the invention that the oscillating transmission signal can be made to be as low as one-half cycle per bit by appropriate filtering.

It is another feature of the invention that the cooperative communications loop may contain more than the number of amplifying stages provided by the terminals, but the stages must be noninverting or pairs of inverting stages.

These, and other objects and features of the present invention, will become more apparent when taken in conjunction with the following description and drawings wherein like characters indicate like parts, and which drawings form a part of the present invention.

DETAILED DESCRIPTION OF THE INVENTION

The cooperative communication system of the instant invention receives its input in binary (digital) form, and also provides outputs in that form. It is to be understood that not shown herein is the conventional apparatus used to convert signals to binary form, but, as would be clear to one skilled in this technical area, once that conversion is done, the cooperative communication system of the instant invention may operate with a great many different types of communication devices.

Figure 1:
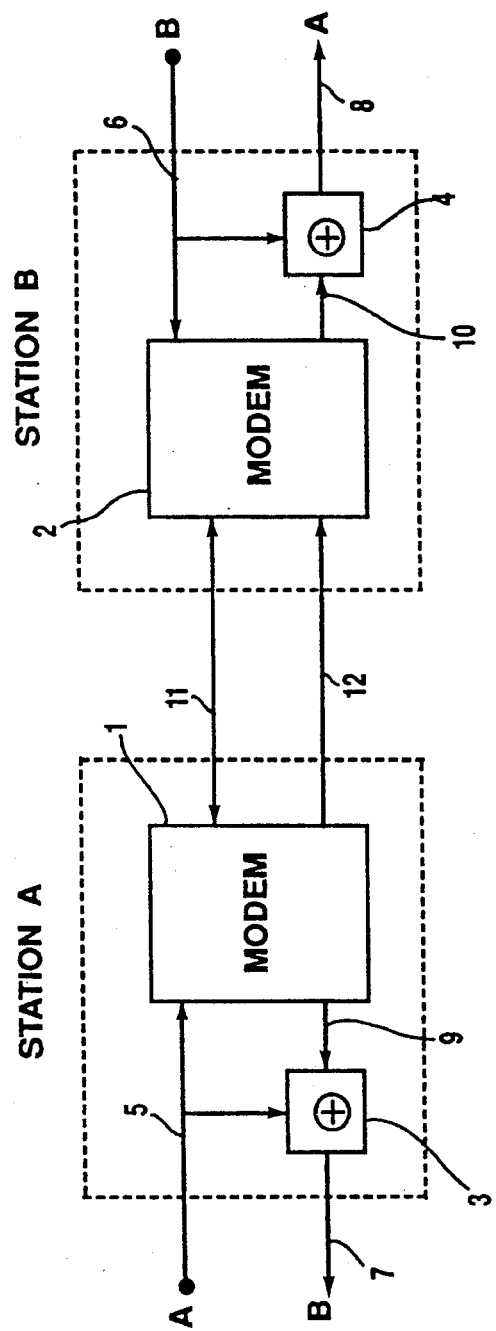
FIG. 1 is a simplified diagram of the cooperative communication system.

FIG. 1 shows the major components of the system. The function of the modem units 1 and 2 is to convert the binary input signals into the oscillatory transmission signals in accordance with Table I whenever either input on lines 5 or 6 is a binary "1", but not when both are "1" or "0". Alternatively, the modems may use these signals to actuate a different frequency for a "1" than for an "0", providing the receiving side has means to convert these signals back to amplitudes. The modem units provide outputs R in binary unipolar form on lines 9 and 10, which are inputs to XOR units 3 and 4. Also, XOR unit 3 has as an input message A from line 5 so that the output of XOR unit 3 is the XOR sum (or product) of the input A and R to provide an output on line 7, which is the message B that was the input to station B. Similarly, the input message B to station B on line 6 is XOR summed with R in XOR unit 4 to provide message A on line 8 of station A.

Figure 2:
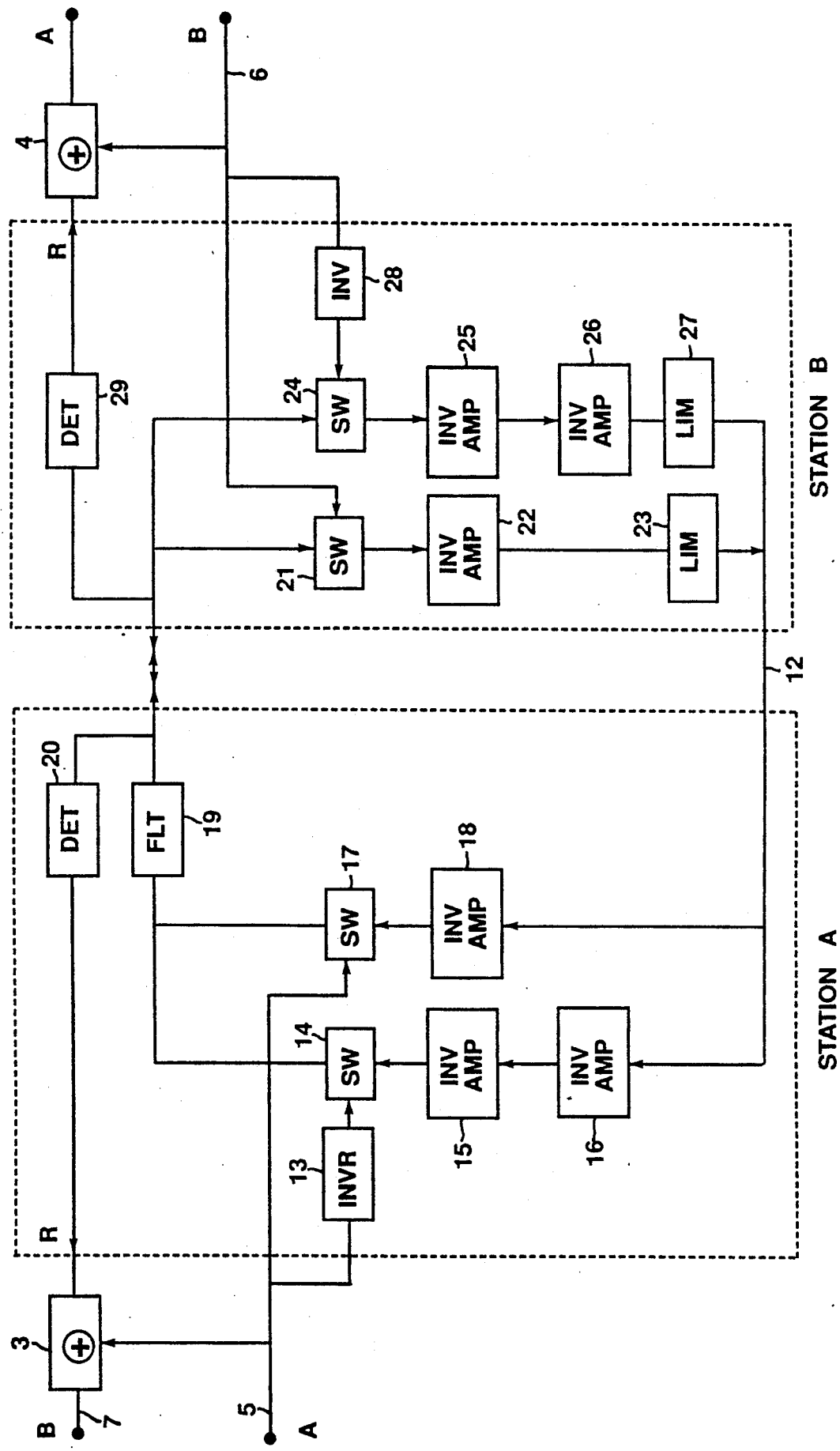
FIG. 2 is a preferred embodiment of the cooperative communication system.

The operation of the modems in the cooperative communication system is shown in the preferred embodiment of the system in FIG. 2. The input to station A is on line 5, which is sent to inverter 13 and switch 14. Inverter 13 may be a unit of wellknown hex inverter 7400 of the TTL logic family, for example. Its function is to invert a logic signal "1" to "0" and "0" to "1". When a "1" is present on line 5, it enables switch 17, which connects inverting amplifier 18 into the cooperative communicating loop. At the same time, inverter 13 provides a "0" signal to switch 14, thereby opening it and ensuring that inverting amplifiers 15 and 16 are disconnected from the cooperative communicating loop. Diode switches may be used for switches 14 and 17 or AND units may be used. NAND units may also be used, such as sections of TTL 7404, but these would also replace one of the inverting amplifiers 15 or 18. Sections of inverting amplifier TTL 7400 may be used for amplifiers 15, 16 and 18. It is to be understood that many other such components may be used to provide these functions such as CMOS equivalents and others.

When input A is "1", station A has switched one stage of inverted amplification into the cooperative communication loop. When the input A is a "0", station A switches two stages of inverting amplification into the loop. In this way, station A provides one or two stages of inverting amplification in accordance with the binary input on line 5.

Similarly, at station B, when a "1" is input on line 6 to modem 2, the "1" bit is applied to switch 21 and inverter 23. These units are the same as switches 17 and inverter 13. This connects inverting amplifier 22 and limiter 23 into the cooperative communicating loop. Inverter amplifiers 25 and 26, and limiter 27, are excluded by switch 24 when activated by the "0" output of inverter 23. When the input on line 6 is an "0", inverting amplifier 22 is switched out and inverting amplifiers 25 and 26 are switched in.

It should be noted that the inverting amplifiers of modem 1 are connected to provide amplification in the direction of the transmission path 11, whereas the inverting amplifiers of modem 2 are connected to provide amplification in the direction of the transmission path 12. When an odd number of inverting amplifiers are switched into the cooperative communicating loop, an oscillation will occur in the system, through, and including, the selected amplifiers, filter 19, and transmission paths 11 and 12, providing the gain around the loop overcomes the losses and provides a loop gain greater than unity. Filter 19 will determine the frequency of oscillation and the limiter 23, or 27, will determine the amplitude of the oscillation signal. Filter 19 may be either a passive or an active filter which does not require inductive components. Limiters 23 and 27 may not be required because amplifiers 22 and 27 may act as limiting amplifiers. Because of the limiting function there is no amplitude variation on transmission in the transmission path 12. Thus, information bits equivalent to R appear only on transmission path 11 when the loop is in a state of oscillation.

The oscillatory state is detected at station A in amplitude detector 20, and at station B in amplitude detector 29. These detected outputs are converted to unipolar form suitable to be applied to XOR units 3 and 4, from which each station obtains an output on lines 7 and 8, which are the message inputs of the opposite station. This follows from:

$$A \oplus B = A \oplus (A \oplus B) = B$$

$$A \oplus B = B \oplus (A \oplus B) = A$$

If A and B are "0" in the preferred embodiment of the instant invention, there will be four stages of amplifications and four inversions resulting in 720 degrees phase shift around the loop and no oscillation. R will then be "0". Similarly, when A and B are "0", there will be 360 degrees phase shift and no oscillation. Again R=O. Thus, the signal R on the transmission line present at both terminals will be equivalent to A+B.

The "oscillation" builds up from noise. Filter 19 requires the presence of signals over an interval equal to the reciprocal of the channel bandwidth. The final value must, therefore, be delayed for a time equal to this interval, and this same delayed signal appears at each terminal. Thus, R is a true composite of the inputs to each terminal.

Figure 3:
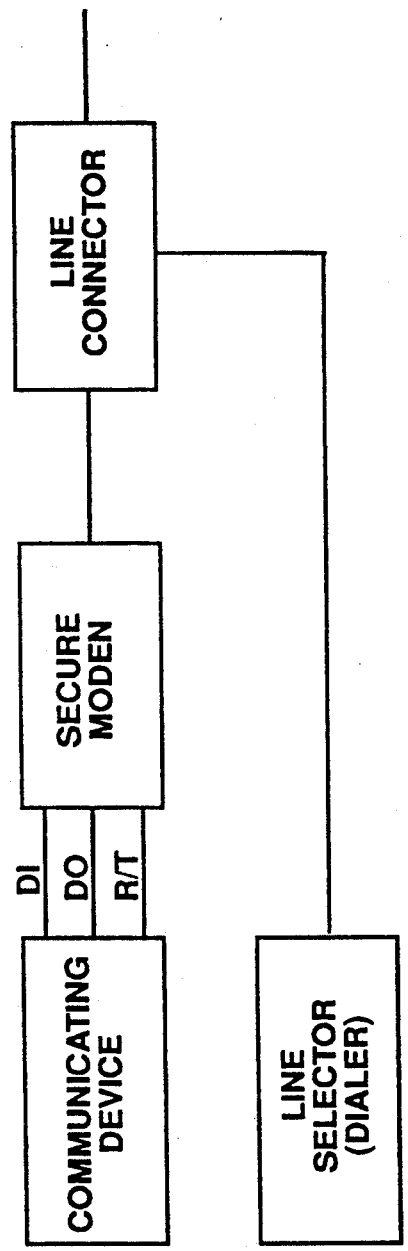
FIG. 3 illustrates a secure modem in accordance with the instant invention.

The instant invention forms the basis for a line of secure modems. These modems will be applied to communication links for transmission of digitized signals as shown in FIG. 3. The communicating device, which may be computer, fax machine, voice, or video, is responsible for supplying and/or receiving the digitized information, and also a receive/transmit (R/T) signal. This R/T signal turns on a random number generator in the secure modem for reception and overrides this random number generator when transmitting. The line selector device (dialer or equivalent) provides signals to the network to supply a line or channel between the terminals. The secure modem uses the inventive technology to transmit secure messages from one terminal to the other. The three devices compose a complete secure terminal. The specifics of the inventive secure modem will vary with the specific application. In some applications, such as a FAX, the secure modem is best incorporated in the communicating device.

The instant inventive modem replaces the existing modem, but additionally provides security, thus reducing overall cost. The invention only requires one channel or line, yet provides full duplex communication between two parties normally requiring two channels. This means that the instant invention can operate on two wire systems without hybrids and on single radio channels.

The instant invention provides the following beneficial features:

1. Total Security. The security is as strong as the random number generator (RNG) used. If RNG is perfectly random, the system is totally secure. The system can survive a Kerchoff attack; i.e., an attempt to break the code by an operator who knows the apparatus in use.

2. No Key Management. For government use the NSA requires approval of the keys used. However, there is no key used in the conventional sense. Such keys are serial bit streams n bits long, which are repeated throughout a message. In the case of a DES algorithm, n is 64 with 8 bits used for error correction. The probability of breaking a 56 bit code is $2^{-56}$. Although this is a very small probability, it does not come close to the security afforded by the instant invention, since the RNG key is as long as the message which may be thousands of bits long. Shannon has proven that if the key is a random number, and is as long as the message, the secrecy is perfect.

3. No Error Proliferation. Errors in the transmission system are immediately detected by each station. If the channel is broken, each side will be receiving its own message.

4. Insensitive to Bit Jitter. Close synchronization between station clocks is not required, since each station uses its own clocked message to decipher. The bit rate of the receiving RNG controls the transmission bit rate. In conventional systems using keys of finite length, exact registration of key and message is required.

5. Low Cost. No key generation and distribution components equivalent to those used in ordinary models are required.

6. End to End Security. Each secure terminal need only operate with the other secure terminal regardless of network complexity.

7. Mobile Communications. Will operate on moving platforms such as autos and aircraft. Unaffected by doppler shift.

8. High Speed Communications. Does not require high speed key generators.

9. Economical of Bandwidth. Requires only one channel for secure communication in either direction.

10. Anti-Spoof. An attempt to tap into an established secure channel using an active signal will immediately alert the true message receiver. It also alters both message and cipher, thus yielding no information to the tapper.

11. Link Security. May be used for link segments, as well as for end to end security.

12. Simple Operation. Simpler to operate than a conventional modem, and is far simpler than present systems.

13. Requires Less Space. No special equipment required, such as a key generator. Can be integral with key equipment, such as computer and fax machines.

14. Asynchronous Operation. Clock does not have to be interchanged between stations for operation.

15. Improved Computer Security. Permits secure interchange of authentication information.

16. One Level of Security Transmission. Inexpensive total security permits use at all levels of security. This prevents leaks resulting in an interchange of information at different security levels.

17. Increased Bandwidth Capability. Messages can be sent simultaneously from each terminal, thereby doubling the capacity of the single channel. This represents a four fold increase in channel capacity over existing digital transmission systems. In this mode of operation, the communication security is dependent on the alphabet of characters used in the messages. Thus, if the messages are composed of letters and numbers (alpha numeric), that are equivalent to 10 equally probable and independent letters and 10 numbers, the effective alphabet of A is 20, and that of B is 20. Then the alphabet of R is $20 \times 20$ or 400. All possible sequences of 10 composite characters are $400^{10}$, or more than $2^{80}$, which is greater than that offered by DES. As the message grows longer, the security becomes greater.

Thus, the message mode affords superior security. As a precaution, the system reverts to the single message per channel mode when information is available at one station only. The other station provides random bits. Alternatively, messages may be buffer stored at each end for secure simultaneous transmission.

18. Diversity of Transmission Medium. The instant invention may be designed for bandwidth capability of any medium. It may also be designed to accommodate transmission delays without impairing data rate.

19. Jamming Resistance. Jamming cannot prevent the transmit station (A in FIGS. 1 and 2) from receiving R, though the receiving station is jammed. Receiving stations (B in FIGS. 1 and 2) may be low power in base station (A)/subscriber station (B) radio communication system configurations.

I claim:

1. A cooperative communication system comprising, first and second communication stations, each station having a predetermined number of amplification stages,
a communications link connecting said first and second stations in a communications loop
means at each station for generating a binary signal and for transmitting said binary signal to the other station,
means at each station responsive to the state of said binary signal for selecting a predetermined number of said amplification stages for amplifying said binary signal, the number of amplification stages selected being determinative of the occurrence of oscillations around said communications loop,
means for detecting the occurrence of oscillations around said communications loop, and
means responsive to the occurrence of said oscillations for detecting a message transmitted from wide first station to said second station.

2. A cooperative communications system in accordance with claim 1 wherein each of said amplification stages is inverting, whereby an output signal from each amplification stage is 180° out of phase with an input signal to that amplification stage.

3. A cooperative communications system in accordance with claim 2, wherein selecting an odd number of said predetermined number of said amplification stages will result in oscillation around said communications loop, while selecting an even number will not result in oscillation around said communications loop.

4. A cooperative communication system in accordance with claim 3, wherein said selecting means includes switch means responsive to said binary signals for activating said predetermined number of amplification stages.

5. A cooperative communication system in accordance with claim 4 wherein said message detecting means includes delay means to adjust the synchronization of local binary signals to received binary signals.

6. A cooperative communication system comprising:
first and second communication stations, each station having a predetermined number of signal inverting stages,
a communications link connecting said first and second stations in a communications loop,
means at each station for generating a binary signal and for transmitting said binary signal to the other station,
means at each station responsive to the state of said binary signal for selecting a predetermined number of said signal inverting stages for transmitting said binary signal, the number of signal inverting stages selected being determinative of the occurrence of oscillations around said communications loop,
means for detecting the occurrence of oscillations around said communications loop, and
means responsive to the occurrence of said oscillations for detecting a message transmitted from said first station to said second station.

* * * * *